Oct. 25, 1927.
A. BELL
1,646,805
LOCK NUT
Filed Feb. 5, 1927
2 Sheets-Sheet 2
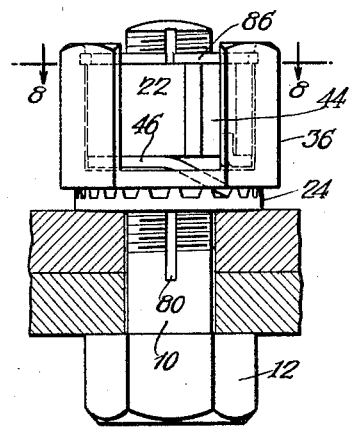
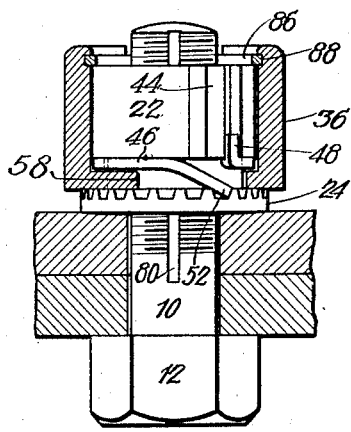
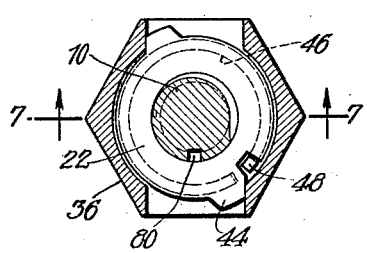
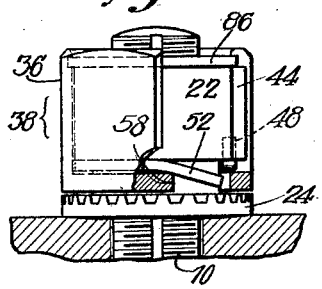
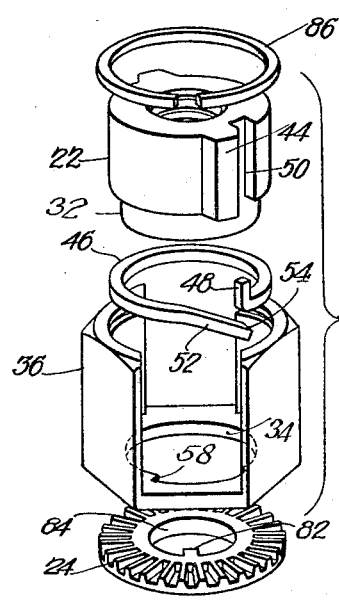
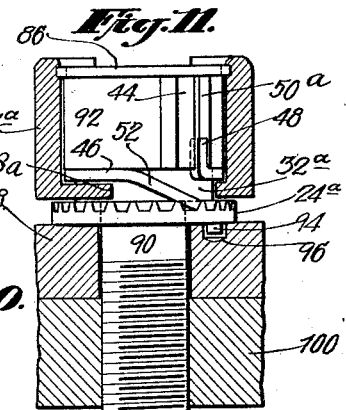
Inventor
ALVAH BELL.
By His Attorney Patented Oct. 25, 1927.

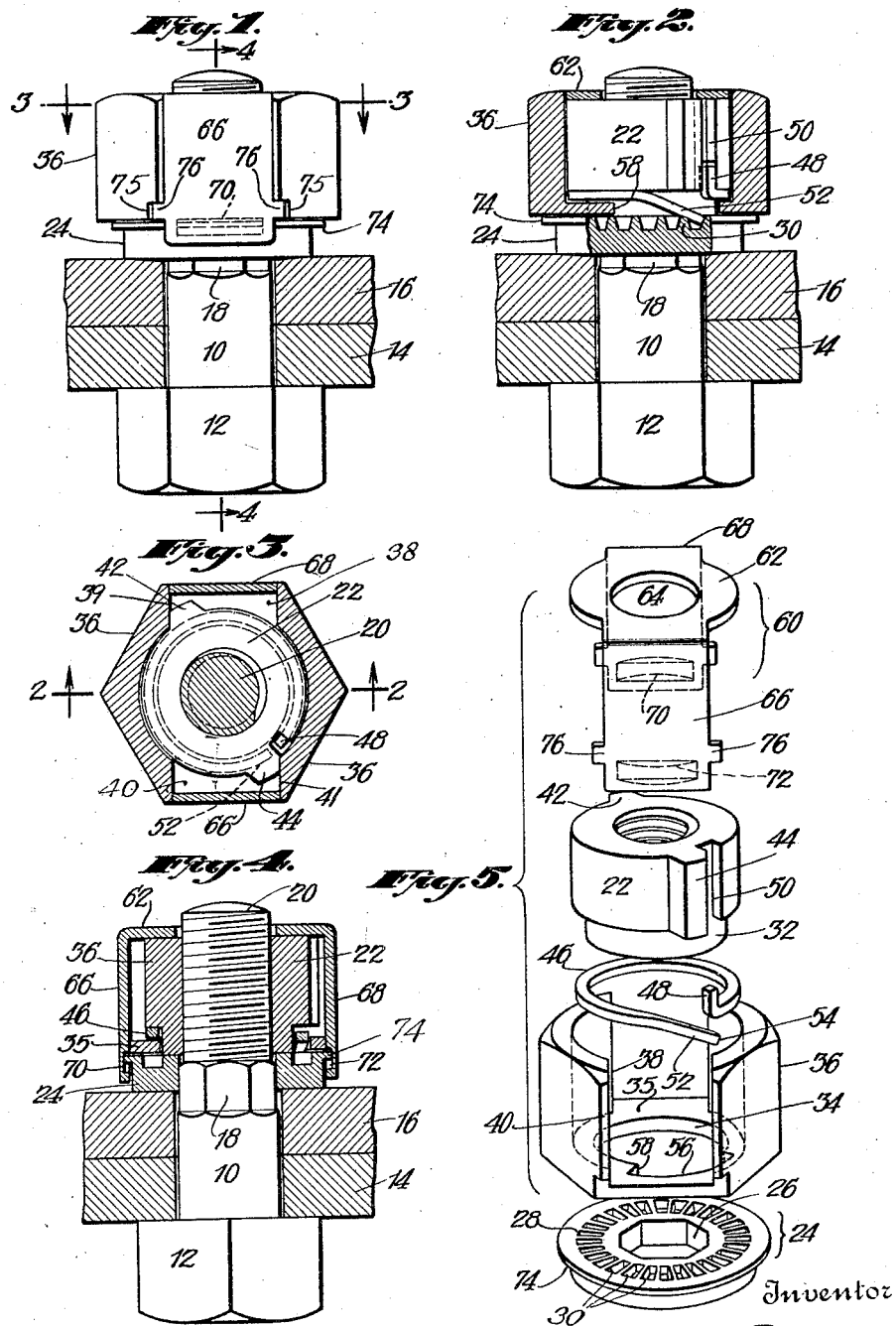

1,646,805

UNITED STATES PATENT OFFICE.

ALVAH BELL, OF BROOKLYN, NEW YORK.

LOCK NUT.

Application filed February 5, 1927. Serial No. 166,044.

This invention relates to an improved device adapted to lock either a bolt, nut, or similar fastening. The invention aims to provide a simple device which can be inexpensively manufactured. The various features of improvement will be apparent from the following specification when read in connection with the accompanying drawings and the features of novelty will be defined with particularity in the appended claims. In the drawings—

Fig. 1 illustrates a preferred embodiment of the invention in side elevation;

Fig. 2 is a similar side elevation parts being broken away and parts being shown in section in the plane indicated by line 2—2 of Fig. 3;

Fig. 3 is a horizontal section on line 3—3 of Fig. 1;

Fig. 4 is a section on line 4—4 of Fig. 1;

Fig. 5 is a view showing the several elements which constitute a complete lock nut embodying my invention;

Fig. 6 is a side elevation of a modified embodiment of the invention;

Fig. 7 is a similar view of a certain part shown in section on a line indicated by 7—7 of Fig. 8;

Fig. 8 is a horizontal section on line 8—8 of Fig. 6;

Fig. 9 is a view similar to Fig. 7 but showing certain parts in the position they assume when the releasing member is actuated to unlock the device;

Fig. 10 is a view showing the component parts of the embodiment of the invention shown in Figs. 6 to 9 inclusive;

Fig. 11 is a view illustrating how the invention is adapted to lock a bolt.

Referring in detail to the drawings, and with particular reference first to Figs. 1 to 5 inclusive, 10 represents the shank of a bolt having a suitable head 12 engaging the underside of any machine element 14 or the like which is to be clamped, for example, to plate 16. The shank of the bolt 10 is formed with a suitable polygonal portion 18. In the case illustrated, the portion 18 is in the form of an octagon. This member merges into the threaded shank 20 which is adapted to coact with a similarly threaded member 22. Fitted over the polygonal portion 18 I provide a holding member 24 having a polygonal central aperture 26 formed therein for coaction with a similarly shaped portion 18 of the bolt 10.

The holding member 24 is formed with a plurality of circularly arranged depressions 28 adapted to form teeth 30 having walls slightly inclined to the vertical as shown clearly in Fig. 2.

The threaded member 22 is of reduced diameter at its lower end to form a journal portion 32 which is adapted to loosely fit an opening 34 formed in the body portion 35 of an operating member 36. The length of the journal portion 32 as measured axially thereof is slightly greater than the combined thickness of the body portion 35 and a spring 46 hereinafter described measured axially so that the threaded member 22 cannot bind the actuating member 36 against the holding member 24. In other words, there is a slight clearance provided between the lower surface of the body 35 and the upper surface of the holding member 24. This operating member is cut away as indicated at 38 and 40 so as to provide shoulders for engagement with outwardly extending lugs 42 and 44.

Embracing the journal portion 32 of the threaded member I provide a resilient locking member 46 preferably made of spring steel. One extremity of this resilient member is turned upwardly as indicated at 48 so as to engage a notch 50 formed in the threaded member 22. The free end of the resilient member 46 is inclined downwardly as indicated at 52 and the end 54 thereof is perpendicular to the inclined portion so as to form a square end. The angle of the walls of the teeth 30 is determined by the angle at which the end 52 is bent down so that in locking position the end of the resilient member squarely engages the wall of the particular tooth 30 with which it coacts. The opening 34 in the actuating member 36 is enlarged as indicated at 56 so as to permit passage therethrough of the end 52 of the resilient member.

The shape of the hole 34 of the cut-away portion 56 is such that a shoulder 58 is formed. This shoulder is brought into play when the actuating member 36 is turned counter-clockwise, it being apparent that turning of said shoulder into contact with the underside of the inclined portion 52 of the locking spring 46 will tend to lift this free end 52 out of engagement with the teeth 30. The angle of the teeth and the square end of the locking spring is such that during this lifting movement, the locking member will not cut or dig into the teeth.

In order to prevent the several parts of the locking device being displaced or mislaid when the lock nut is disconnected from the bolt, I preferably provide a retaining member adapted to keep all the parts in proper assembled relationship. The preferred form of retaining means is indicated in Figs. 1 to 5 inclusive. This comprises a retaining member indicated as a whole at 60. As clearly shown in Figs. 4 and 6 this member is in the form of a substantially or approximately U-shape consisting of a bridge portion 62 having a central opening 64 therein to permit free passage of the threaded shank 20 of the bolt. Arms 66 and 68 extend downwardly from the bridge portion 62, these arms being recessed at either end as indicated at 70 and 72 for coaction with an overhanging flange 74 formed integrally on the holding member 24. The depth of the recesses 70 and 72 is such that the parts will not bind when the threaded member is slightly turned in releasing the locking device. The width of the downwardly extending arms 66 and 68 is such that they loosely fit in the openings 38 and 40 formed in the actuating member 36. This actuating member is notched as indicated at 75 and the arms 66 and 68 are provided with laterally extending lugs 76 and thus hold the retaining member in engagement with said actuating member 36. In operation, assuming that the device is attached to a bolt having right-hand threads as illustrated, the actuating device 36 is turned clockwise (as viewed from the top of Figs. 1 and 3). The shoulders 39 and 41 will engage the lugs 42 and 44 to transmit movement to the threaded member 22. As this member turns it will carry with it the locking spring 46, the same riding over the teeth of the holding member 24 until a desired position of the threaded member is secured. It is to be noted that the device will permit the threaded member to be locked in such a way that there may be a slight clearance so as to permit, for example, the bolt shank 10 to turn freely in the members 14 and 16. Yet the nut or threaded member 22 will be securely locked against turning with respect to the shank of the bolt. In other words, the parts need not all be jammed in order to lock. Such a lock nut is useful on machine parts requiring a running fit. For example, a lock nut of this character might be used to good advantage on the front wheel supporting spindle of an automobile for holding the ball cage of a bearing in proper place.

Figs. 6 to 10 inclusive illustrate a modification of the invention which in many respects is identical to the construction above described. The corresponding parts are accordingly lettered and repetition of description of these parts is thought unnecessary. In the modification instead of providing a polygonal portion on the bolt for co-operation with a polygonal opening formed in the holding member 24, the bolt is provided with a longitudinal slot similar to a keyway as indicated at 80. The member 24 is formed with a projection 82 extending inwardly from a circular opening 84 as clearly shown in Fig. 10. The projection 82 is adapted to fit the slot 80 as will be understood. In this embodiment of the invention several parts of the locking device are held in assembled relationship by means of a spring snap-ring 86 which engages an annular depression 88 formed near the upper end of the actuating member 36.

Fig. 9 illustrates the manner in which the actuating member 38 lifts the end 52 of the spring 46 out of engagement with the teeth of the holding member 24.

Fig. 11 illustrates how the invention may be applied to a bolt. In this arrangement 90 represents the shank of a bolt which is formed with an integral head 92 the exterior of which is shaped exactly like the exterior of the member 22 shown in Fig. 10. The same sort of locking spring 46 will surround an integral cylindrical portion $32^a$ formed on the head 92. The spring will be provided with an upturned end 48 for engagement with a slot $50^a$ formed in the head 92. An actuating member $36^a$ of exactly the same form as shown at 36 in Fig. 8 is provided for coacting with the lugs $44^a$ on the head 92 and also with a shoulder $58^a$ for coacting with the downturned end 52 of the locking spring 46. The holding member $24^a$ will be provided with teeth for coaction with the spring 46 and to prevent said holding member from turning a lug or pin 94 is secured thereto. This pin engages a suitable hole or depression 96 formed in the member 98 which is assumed to be in part clamped to another part 100 by the bolt.

While I have described quite precisely the details of the embodiments of the invention illustrated, it is to be understood that various modifications and substitution of equivalents may be made without departure from the invention as defined in the appended claims.

What I claim is:—

1. A lock nut comprising a threaded member, an actuating member and a spring locking member both journalled loosely on said threaded member, and a toothed holding member for coaction with said locking member.

2. A lock nut comprising a threaded member having a journal portion of reduced diameter, a locking spring and an actuating member embracing said journal portion, a lug on said threaded member, a shoulder on said actuating member for coaction with said lug, and a toothed holding member for coaction with said spring.

In witness whereof, I have hereunto signed my name.

ALVAH BELL.